United States Patent
Lipchuk et al.

(10) Patent No.: US 10,628,147 B2
(45) Date of Patent: Apr. 21, 2020

(54) DETACH VIRTUAL MACHINE FROM VIRTUAL MACHINE TEMPLATE

(71) Applicant: Red Hat Israel, Ltd., Raanana (IL)

(72) Inventors: Maor Lipchuk, Raanana (IL); Arik Hadas, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 151 days.

(21) Appl. No.: 15/688,987

(22) Filed: Aug. 29, 2017

(65) Prior Publication Data

US 2019/0065170 A1    Feb. 28, 2019

(51) Int. Cl.
| | |
|---|---|
| G06F 9/455 | (2018.01) |
| G06F 8/61 | (2018.01) |
| G06F 9/445 | (2018.01) |
| G06F 8/36 | (2018.01) |

(52) U.S. Cl.
CPC .............. *G06F 8/63* (2013.01); *G06F 8/36* (2013.01); *G06F 9/44505* (2013.01); *G06F 9/45558* (2013.01); *G06F 2009/4557* (2013.01); *G06F 2009/45562* (2013.01); *G06F 2009/45579* (2013.01)

(58) Field of Classification Search
CPC ........................................................ G06F 8/63
See application file for complete search history.

(56) References Cited

U.S. PATENT DOCUMENTS

| | | | |
|---|---|---|---|
| 8,171,201 B1 | 5/2012 | Edwards, Sr. | |
| 8,307,187 B2 | 11/2012 | Chawla et al. | |
| 9,032,402 B2 * | 5/2015 | Zheng | G06F 9/45558 718/1 |
| 9,455,871 B1 | 9/2016 | Chheda et al. | |
| 9,547,513 B2 | 1/2017 | Zamir | |
| 2010/0049930 A1 * | 2/2010 | Pershin | G06F 11/1451 711/162 |
| 2013/0263119 A1 * | 10/2013 | Pissay | G06F 9/45558 718/1 |
| 2014/0089921 A1 * | 3/2014 | Yang | G06F 9/45558 718/1 |

(Continued)

OTHER PUBLICATIONS

Shields (How can I convert a thin-provisioned disk to thick, ora thick-provisioned disk to thin, in ESX 4.0, dated Jul. 7, 2010, URL: https://www.itprotoday.com/print/60066).*

(Continued)

*Primary Examiner* — Hang Pan
(74) *Attorney, Agent, or Firm* — Withrow & Terranova, PLLC (57) ABSTRACT

Mechanisms for detaching a thin-provisioned virtual machine (VM) from a VM template are disclosed. A request to detach a thin-provisioned VM from a VM template is received. The thin-provisioned VM is linked to the VM template and has at least one delta volume that is linked to a volume of the VM template. For each delta volume of the thin-provisioned VM, a corresponding merged volume is caused to be generated that is not linked to the VM template and that comprises contents of the delta volume and contents of the volume of the VM template to which the delta volume is linked. VM configuration data is altered to indicate that the thin-provisioned VM is an independent VM that is no longer linked to the VM template.

18 Claims, 8 Drawing Sheets

(56) References Cited

U.S. PATENT DOCUMENTS

| | | | |
|---|---|---|---|
| 2014/0201725 A1* | 7/2014 | Tian .......................... | G06F 8/63 717/169 |
| 2015/0074054 A1* | 3/2015 | Antony ............... | G06F 9/45558 707/639 |
| 2016/0103851 A1 | 4/2016 | Dimitrov et al. | |

OTHER PUBLICATIONS

Author Unknown, "Exporting and Importing Virtual Machines and Templates," Virtual Machine Management Guide, Section 6.12., access.redhat.com/documentation/en-US/Red_Hat_Enterprise_Virtualization/3.6/html/Virtual_Machine_Management_Guide/sect-Exporting_and_Importing_Virtual_Machines_and_Templates, accessed Jun. 27, 2017, Red Hat, Inc., 8 pages.

Author Unknown, "How to convert VMware virtual disks from thin to thick with the vSphere client," www.tech-recipes.com/rx/11261/how-to-convert-vmware-virtual-disks-from-thin-to-thick-with-the-vsphere-client, Feb. 2, 2011, QD Ideas, LLC, 3 pages.

Author Unknown, "Migrating VMs from one datastore to another on ESXi 5.1 (free license)," Discussion Forum, communities.vmware.com/thread/451108, last updated Nov. 5, 2014, VMware, Inc., 9 pages.

Author Unknown, "Move VMware ESXi VM to new datastore—preserve thin-provisioning," Server Fault, Question/Answer forum, www.serverfault.com/questions/372526/move-vmware-esxi-vm-to-new-datastore-preseve-thin-provisioning, last edited Apr. 13, 2017, 4 pages.

Author Unknown, "Understanding Virtual Machine Storage," Chapter II: Virtual Machine Disks, www.ovirt.org/documentation/admin-guide/chap-Virtual_Machine_Disks, accessed Jun. 27, 2017, oVirt, 9 pages.

Author Unknown, "Create a Red Hat Enterprise Linux Template," Red Hat Enterprise Virtualization 3.0, Evaluation Guide, Edition 1, Lab 2, Section 2, 2011, Red Hat, Inc., 5 pages.

Hildred, Tim, et al., "Templates and Protocols," Red Hat Enterprise Virtualization 3.0, Technical Reference Guide, Edition 1, Chapter 8, 2011, Red Hat, Inc., 4 pages.

* cited by examiner

FIG. 6

DETACH VIRTUAL MACHINE FROM VIRTUAL MACHINE TEMPLATE

TECHNICAL FIELD

The examples relate generally to virtual machines, and in particular to detaching a virtual machine from a virtual machine template.

BACKGROUND

A virtual machine (VM) template may be used to relatively rapidly initiate VMs that have the same characteristics as the VM template. The use of a VM template may be particularly advantageous in a highly dynamic computing environment, such as a cloud computing environment. A VM initiated from a VM template can be a thin-provisioned VM or a cloned VM. A cloned VM contains a complete copy of the volumes of the VM template. Generating the copies of the volumes takes an amount of time proportional to the size of the volumes. A thin-provisioned VM does not copy the volumes of the VM template, but rather uses the volumes of the VM template for read operations, and generates additional volume space only as needed in a separate copy-on-write (COW) image for write operations.

SUMMARY

The disclosed examples relate to mechanisms for detaching a thin-provisioned virtual machine (VM) from a VM template. The volumes of the thin-provisioned VM are separated from the volumes of the VM template, and data that identifies the thin-provisioned VM as being linked to the VM template is altered to identify that the thin-provisioned VM is an independent VM that is no longer linked to the VM template.

In one example a method is provided. The method includes receiving a request to detach a thin-provisioned VM from a VM template, the thin-provisioned VM being linked to the VM template and having at least one delta volume that is linked to a volume of the VM template. The method further includes causing, for each delta volume of the thin-provisioned VM, a corresponding merged volume to be generated that is not linked to the VM template and that comprises contents of the delta volume and contents of the volume of the VM template to which the delta volume is linked. The method further includes altering VM configuration data to indicate that the thin-provisioned VM is an independent VM that is no longer linked to the VM template.

In another example a computing device is provided. The computing device includes a memory and a processor device coupled to the memory. The processor device is to receive a request to detach a thin-provisioned VM from a VM template, the thin-provisioned VM being linked to the VM template and having at least one delta volume that is linked to a volume of the VM template. The processor device is further to cause, for each delta volume of the thin-provisioned VM, a corresponding merged volume to be generated that is not linked to the VM template and that comprises contents of the delta volume and contents of the volume of the VM template to which the delta volume is linked. The processor device is further to alter VM configuration data to indicate that the thin-provisioned VM is an independent VM that is no longer linked to the VM template.

In another example a computer program product is provided. The computer program product is stored on a non-transitory computer-readable storage medium and includes instructions to cause a processor device to receive a request to detach a thin-provisioned VM from a VM template, the thin-provisioned VM being linked to the VM template and having at least one delta volume that is linked to a volume of the VM template. The instructions further cause the processor device to cause, for each delta volume of the thin-provisioned VM, a corresponding merged volume to be generated that is not linked to the VM template and that comprises contents of the delta volume and contents of the volume of the VM template to which the delta volume is linked. The instructions further cause the processor device to alter VM configuration data to indicate that the thin-provisioned VM is an independent VM that is no longer linked to the VM template.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first snapshot" and "second snapshot," and does not imply a priority, a type, an importance, or other attribute, unless otherwise stated herein. As used herein and in the claims, the articles "a" and "an" in reference to an element refers to "one or more" of the element unless otherwise explicitly specified.

The phrase "virtual machine" as used herein refers to a standalone environment implemented on a host computing device that has its own operating system and is capable of executing application processes. Non-limiting examples of virtual machine implementations in which the present examples have applicability are the VMware® virtualization environment, the Red Hat® virtualization environment, kernel-based virtual machines, and the Microsoft® virtualization environment, as well as any other virtualization environment that allows the generation of a thin-provisioned VM from a VM template.

A thin-provisioned virtual machine (VM) is a VM that is initiated from a VM template. The volumes of the VM template are not copied to the thin-provisioned VM. This can save a substantial amount of time, and disk space, when the thin-provisioned VM is initiated. This may be particularly suitable in a highly dynamic environment, such as a cloud computing environment; however, thin-provisioned VMs may be used in environments other than cloud computing environments. For each volume of the VM template, a corresponding delta volume (sometimes implemented as a copy-on-write (COW) volume or a Quick Emulator (QEMU) copy-on-write (QCOW) volume) is created for the thin-provisioned VM, which is initially empty. Data modifications, such as additions to or deletions of the data in a volume, are stored in the delta volume. Read accesses are first attempted on the delta volume, and if the requested data does not exist in the delta volume, the corresponding volume of the VM template is accessed to satisfy the read request.

While thin-provisioned VMs offer certain advantages, they also have certain disadvantages. Performance of a thin-provisioned VM can be lower than that of an independent VM due to the inefficiencies of the delta-volume-to-VM-template-volume chain created for each volume of the thin-provisioned VM. Moreover, a VM template cannot be deleted if a thin-provisioned VM is linked to the VM template because the thin-provisioned VM relies on the volumes of the VM template for data that existed in the volumes prior to the initiation of the VM. A thin-provisioned VM cannot be exported to a remote system without also exporting the VM template. The volumes of a thin-provisioned VM cannot be migrated to a storage domain that does not contain the disks of the VM template on which the thin-provisioned VM is based.

The examples facilitate the detachment of a thin-provisioned VM from a VM template to convert the thin-provisioned VM into an independent VM. Once detached, the independent VM is no longer tied to the VM template, and the above-referenced disadvantages of a thin-provisioned VM no longer apply to the independent VM.

Throughout the drawings metadata will be shown depicted in close proximity to the entity to which the metadata relates, but in practice the metadata can be physically separated from the entity to which the metadata relates, such as in a separate data structure on a separate storage device.

Figure 1A:
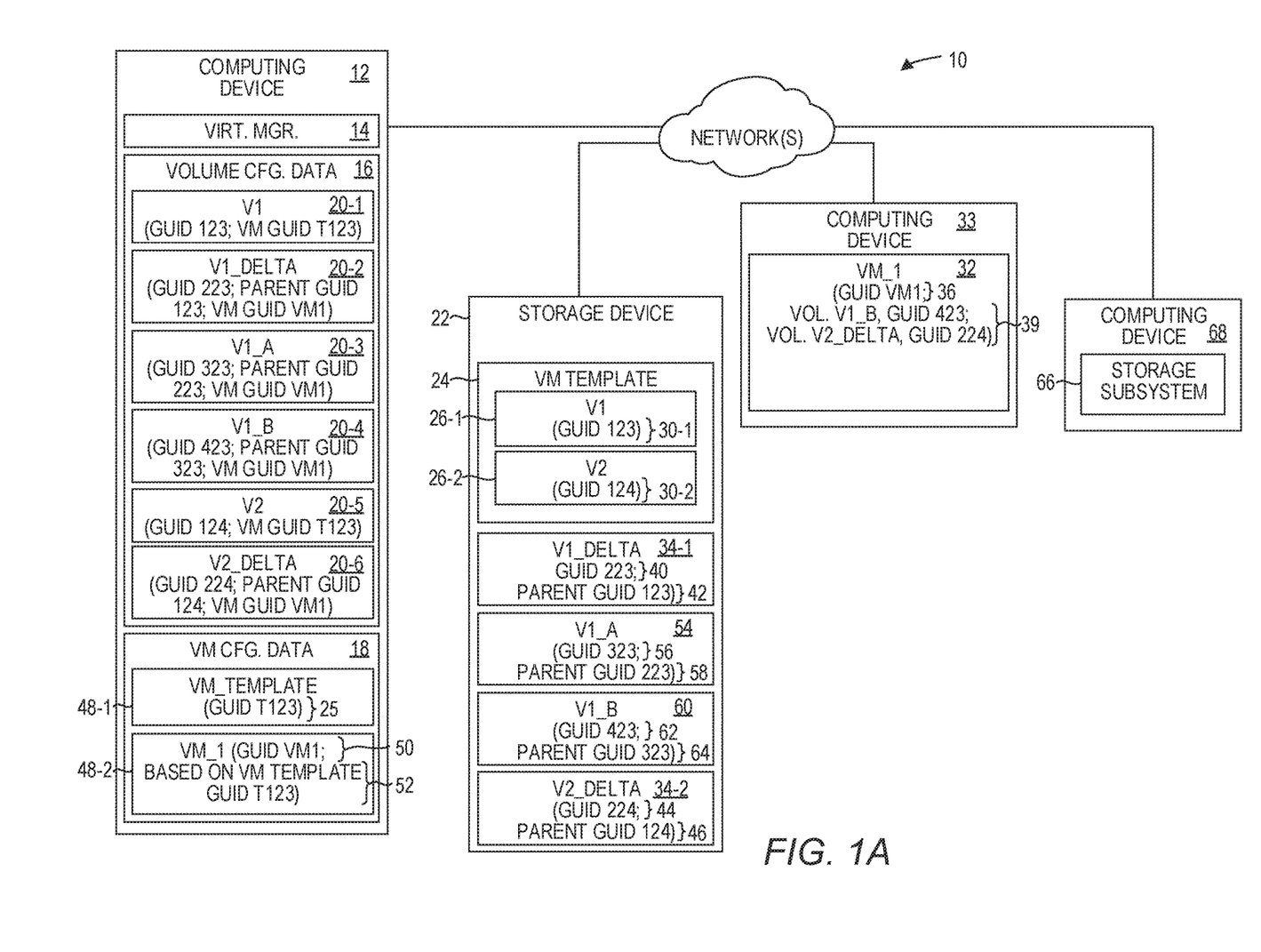
FIGS. 1A-1C are block diagrams of an environment at three different instances in time to illustrate the detachment of a thin-provisioned VM from a VM template according to one example.

FIG. 1A is a block diagram of an environment 10 in which examples may be practiced. The environment 10 includes a computing device 12 on which a virtualization manager 14 executes. The virtualization manager 14 implements and controls aspects of the environment 10 that include, for example, the generation and deletion of virtual machines in the environment 10. The virtualization manager 14 includes, or has access to, volume configuration data 16 and VM configuration data 18. The volume configuration data 16 includes a plurality of volume entries 20-1-20-6, each volume entry 20-1-20-6 containing information about a corresponding volume in the environment 10. The information may include, for example, a globally unique identifier (GUID) that identifies the corresponding volume, and a GUID that identifies the VM or VM template to which the corresponding volume belongs.

A storage device 22 contains a VM template 24. The VM template 24 includes a plurality of volumes 26-1, 26-2. The volume entry 20-1 in the volume configuration data 16 corresponds to the volume 26-1. The volume entry 20-5 in the volume configuration data 16 corresponds to the volume 26-2.

A VM configuration entry 48-1 in the VM configuration data 18 identifies the VM template 24. The VM configuration entry 48-1 includes metadata 25 that is associated with the VM template 24, such as, for example, a GUID that uniquely identifies the VM template 24. Each of the volumes 26-1, 26-2 have associated metadata 30-1, 30-2, respectively, such as GUIDs that uniquely identify the volumes 26-1, 26-2.

The virtualization manager 14 initiates a thin-provisioned VM 32 (VM_1). This may be done, for example, in response to operator input, or automatically based on a need for additional resources. The VM 32 may be initiated on any available computing device 33. The VM 32 has associated metadata 36 that is a GUID that uniquely identifies the VM 32 and has metadata 39 that identifies the volumes of the VM 32.

As part of the initialization, the virtualization manager 14 generates, for each of the volumes 26-1, 26-2 of the VM template 24, corresponding delta volumes 34-1, 34-2 (generally, "delta volumes 34"), respectively, in the storage device 22. The delta volumes 34-1, 34-2 may comprise, for example, QCOW volumes that are initially empty. The delta volume 34-1 has associated metadata 40, which is a GUID that uniquely identifies the delta volume 34-1, and metadata 42 which is a GUID of the volume 26-1 to which the delta volume 34-1 is linked. Similarly, the delta volume 34-2 has associated metadata 44, which is a GUID that uniquely identifies the delta volume 34-2, and metadata 46 which is a GUID of the volume 26-2 to which the delta volume 34-2 is linked.

After initialization of the VM 32, the virtualization manager 14 generates VM configuration entry 48-2 that identifies the VM 32. The VM configuration entry 48-2 contains metadata 50, which is the GUID of the VM 32, and metadata 52, which indicates that the VM 32 is based on the VM template 24 and that the VM 32 is thus linked to the VM template 24.

After the initialization of the VM 32, a snapshot of the delta volume 34-1 is taken, resulting in the generation of a snapshot volume 54. As used herein, a "snapshot" is a new volume that refers to an existing original volume. Any writes issued to the existing original volume will be made to the snapshot rather than to the existing original volume. This is transparent to any application processes which continue to direct writes to the original volume. Thus, in this example, a write directed to the delta volume 34-1 will be made to the snapshot volume 54 after the generation of the snapshot volume 54 and not to the delta volume 34-1. A snapshot is a mechanism for halting further modifications to the original volume. The snapshot mechanism, among other advantages, facilitates easily returning to a previous state of a volume.

The snapshot volume 54 includes metadata 56 which is a GUID of the snapshot volume 54, and metadata 58, which is a GUID of the delta volume 34-1, thereby identifying the delta volume 34-1 as a parent volume to the snapshot volume 54.

After a period of time, a second snapshot of the delta volume 34-1 is taken, resulting in the generation of a snapshot volume 60. After generation of the snapshot volume 60, writes that are directed to the delta volume 34-1 will be written to the snapshot volume 60 rather than to the delta volume 34-1 or the snapshot volume 54. The snapshot volume 60 includes metadata 62 which is a GUID of the snapshot volume 60, and metadata 64, which is a GUID of the snapshot volume 54, thereby identifying the snapshot volume 54 as a parent volume to the snapshot volume 60.

The volume configuration data 16 maintains information that identifies volumes in the environment 10, and the relationships of the volumes in the environment 10. Thus, when a new volume is generated in the environment 10, a new volume entry 20 is created and stored in the volume configuration data 16. The volume entries 20-2, 20-6, 20-3, and 20-4 were generated in response to the generation of the volumes 34-1, 34-2, 54, and 60, respectively. The volume entries 20-2, 20-6, 20-3, and 20-4 contain metadata that identify the volumes 34-1, 34-2, 54, and 60, and the relationships of the volumes 34-1, 34-2, 54, and 60 to each other and to any other volumes. For purposes of illustration, throughout the drawings the volume metadata that is identified in the volume entries 20-1-20-6 is also depicted in conjunction with the volumes to which the volume entries 20-1-20-6 correspond. However, in operation, the volume metadata may exist only in the volume entries 20-1-20-6.

In some examples, the virtualization manager 14 may cause volume generation, volume removal, or other volume management discussed herein by handling such actions directly. In other examples, the virtualization manager 14 may cause volume generation, volume removal, or other volume management discussed herein indirectly via a storage subsystem 66 that executes on one or more computing devices 68. For example, the virtualization manager 14 may direct the storage subsystem 66 to generate the volume 34-1 and then wait for the storage subsystem 66 to inform the virtualization manager 14 that the storage subsystem 66 has created the volume 34-1, or the virtualization manager 14 may, for example, monitor the storage device 22 for the creation of the delta volume 34-1.

Figure 1B:
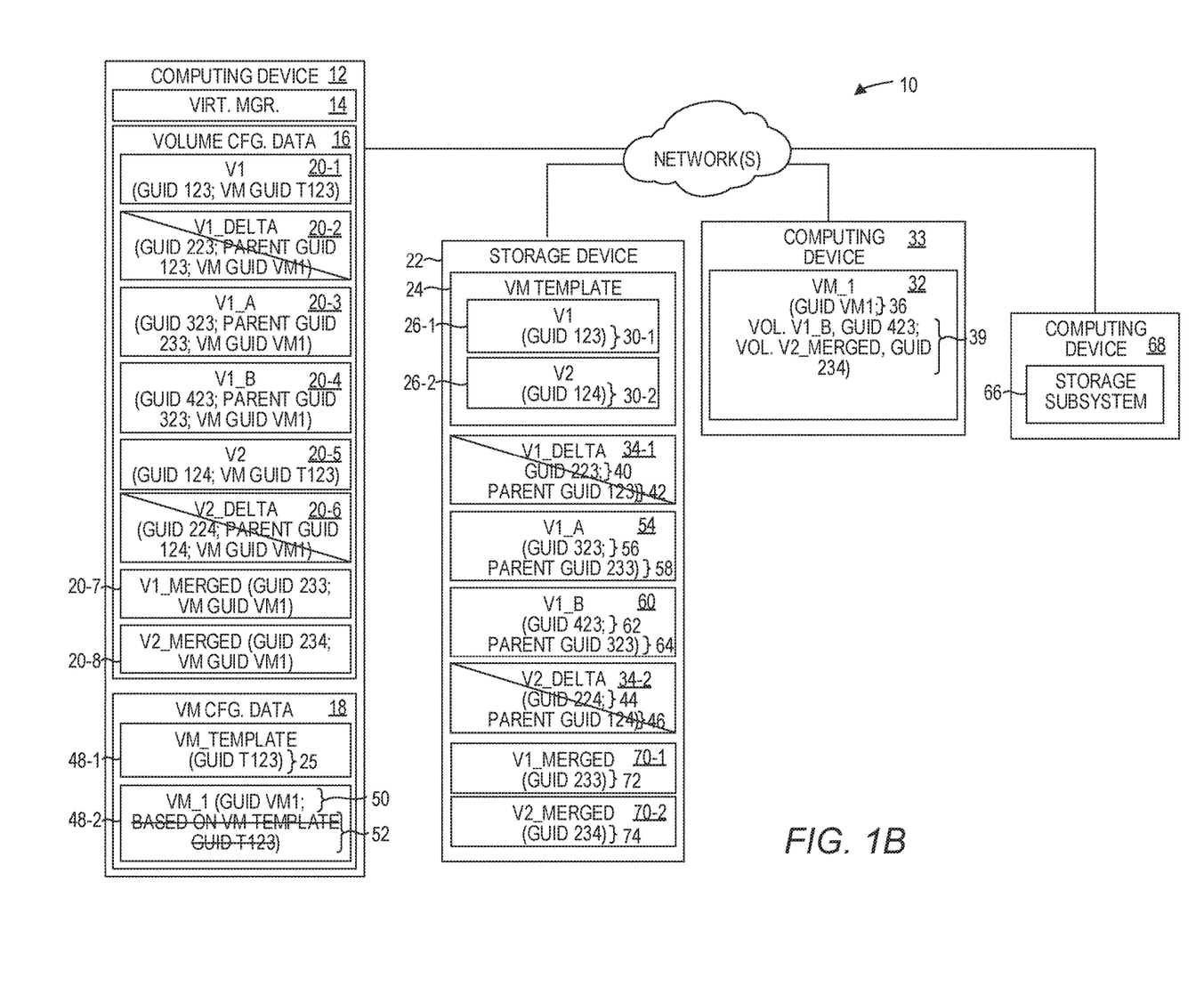

Referring now to FIG. 1B, assume that an operator desires to detach the thin-provisioned VM 32 from the VM template 24. The operator may enter a command, such as a DETACH command with certain parameters, such as the name of the thin-provisioned VM 32. The virtualization manager 14 receives the DETACH command and the accompanying parameters to detach the thin-provisioned VM 32 from the VM template 24.

The virtualization manager 14 accesses the VM configuration data 18 and determines that the VM 32 is linked to the VM template 24, and is thus a thin-provisioned VM. The virtualization manager 14 then accesses the volume configuration data 16 and, based on the volume entries 20-1-20-6, determines that the thin-provisioned VM 32 has the delta volumes 34-1, 34-2, which are based, respectively, on the volumes 26-1, 26-2. The virtualization manager 14 generates, for the delta volume 34-1, a new merged volume 70-1 that is not linked to the VM template 24 and that comprises the contents of the volume 26-1 and the contents of the delta volume 34-1. In one example, the virtualization manager 14 may cause the generation of the merged volume 70-1 by issuing a command to the storage subsystem 66 to merge the data of the delta volume 34-1 and the volume 26-1 of the VM template 24. In one example, the storage subsystem 66 copies the contents of the volume 26-1 to the merged volume 70-1. The storage subsystem 66 then commits the data in the delta volume 34-1 to the merged volume 70-1. In a QEMU context, this may comprise a block commit. The commit process causes subsequent read operations and write operations to the delta volume 34-1 to be directed to the corresponding merged volume 70-1.

The merged volume 70-1 has metadata 72 that includes a GUID that uniquely identifies the merged volume 70-1. Because the merged volume 70-1 is no longer linked to the volume 26-1, the metadata 72 does not identify a parent volume. The virtualization manager 14 also generates a new volume entry 20-7 that identifies the merged volume 70-1.

The virtualization manager 14 also determines that the snapshot volume 54 is a snapshot of the delta volume 34-1. In this example, the virtualization manager 14 determines that a plurality of snapshot volumes 54, 60 of the delta volume 34-1 exists, and determines that the snapshot volume 54 is the first generated snapshot volume of the plurality of snapshot volumes 54, 60. The virtualization manager 14 modifies the metadata 58 of the snapshot volume 54 to identify the merged volume 70-1 as the parent volume of the snapshot volume 54.

The virtualization manager 14 repeats this process for each delta volume 34 of the thin-provisioned VM 32. Thus, the virtualization manager 14 generates, for the delta volume 34-2, a new merged volume 70-2 that is not linked to the VM template 24, and that comprises the contents of the volume 26-2 and the contents of the delta volume 34-2. The merged volume 70-2 has metadata 74 that includes a GUID that uniquely identifies the merged volume 70-2. Because the merged volume 70-2 is no longer linked to the volume 26-2, the metadata 74 does not identify a parent volume. The virtualization manager 14 also generates a new volume entry 20-8 that identifies the merged volume 70-2. The virtualization manager 14 alters the volume configuration data 16 to direct subsequent read operations and write operations directed to the delta volume 34-2 to be directed to the corresponding merged volume 70-2.

The virtualization manager 14 alters the VM configuration data 18 to indicate that the thin-provisioned VM 32 is an independent VM 32 that is no longer linked to the VM template 24. In particular, the virtualization manager 14 removes the metadata 52 from the VM configuration entry 48-2. The VM configuration entry 48-2 no longer identifies the VM 32 as being linked or otherwise associated with the VM template 24. The virtualization manager 14 also removes the metadata 39 that previously identified volumes of the VM 32. After this processing, the VM 32 is no longer a thin-provisioned VM, and is no longer linked to or otherwise associated with the VM template 24. The virtualization manager 14 also alters the metadata 39 of the VM 32 to identify the new merged volume 70-2.

Figure 1C:
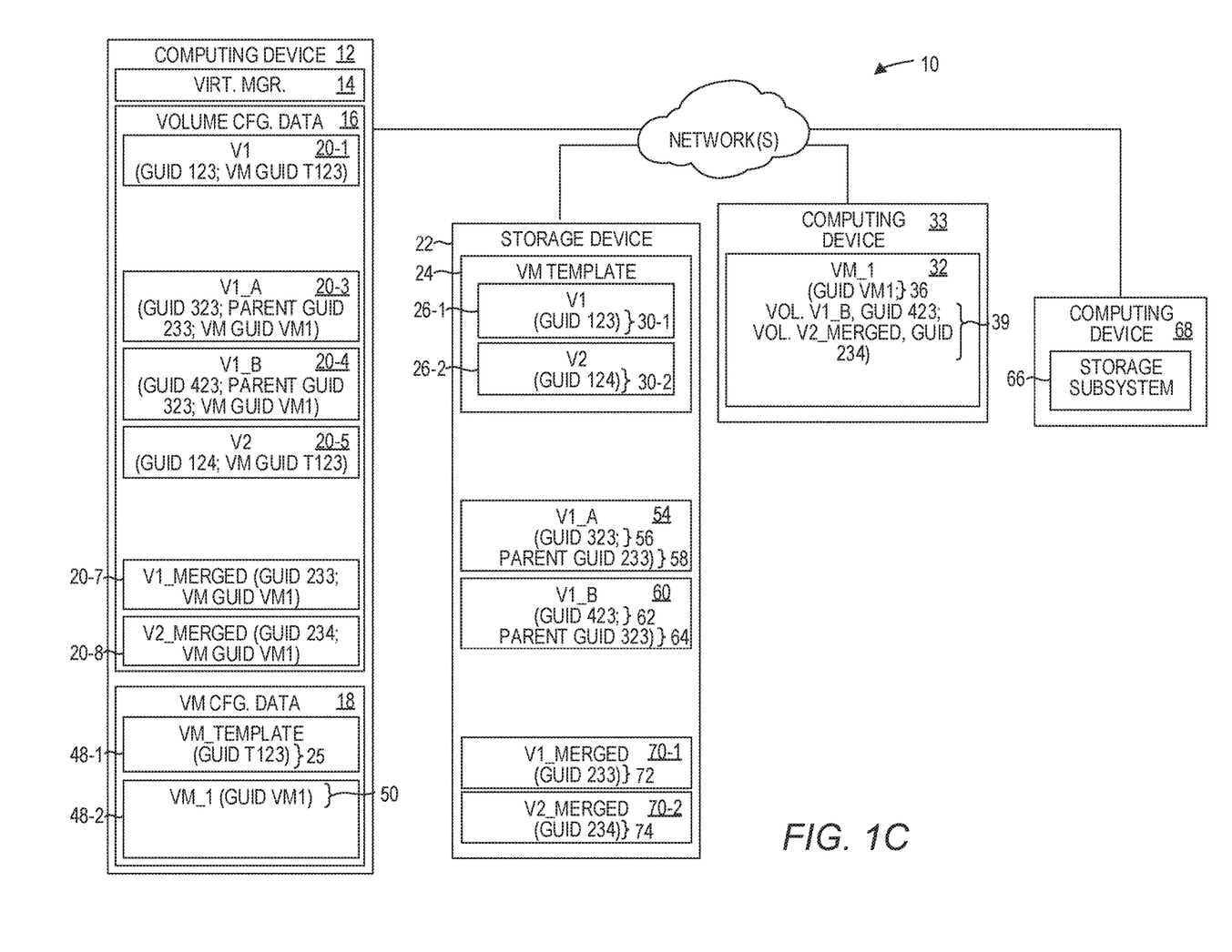

In some examples, the virtualization manager 14 may also remove the delta volume 34-1 and the delta volume 34-2, as well as the volume entries 20-2, 20-6. FIG. 1C is a block diagram of the environment 10 after the processing discussed above with regard to FIG. 1B.

Figure 2:
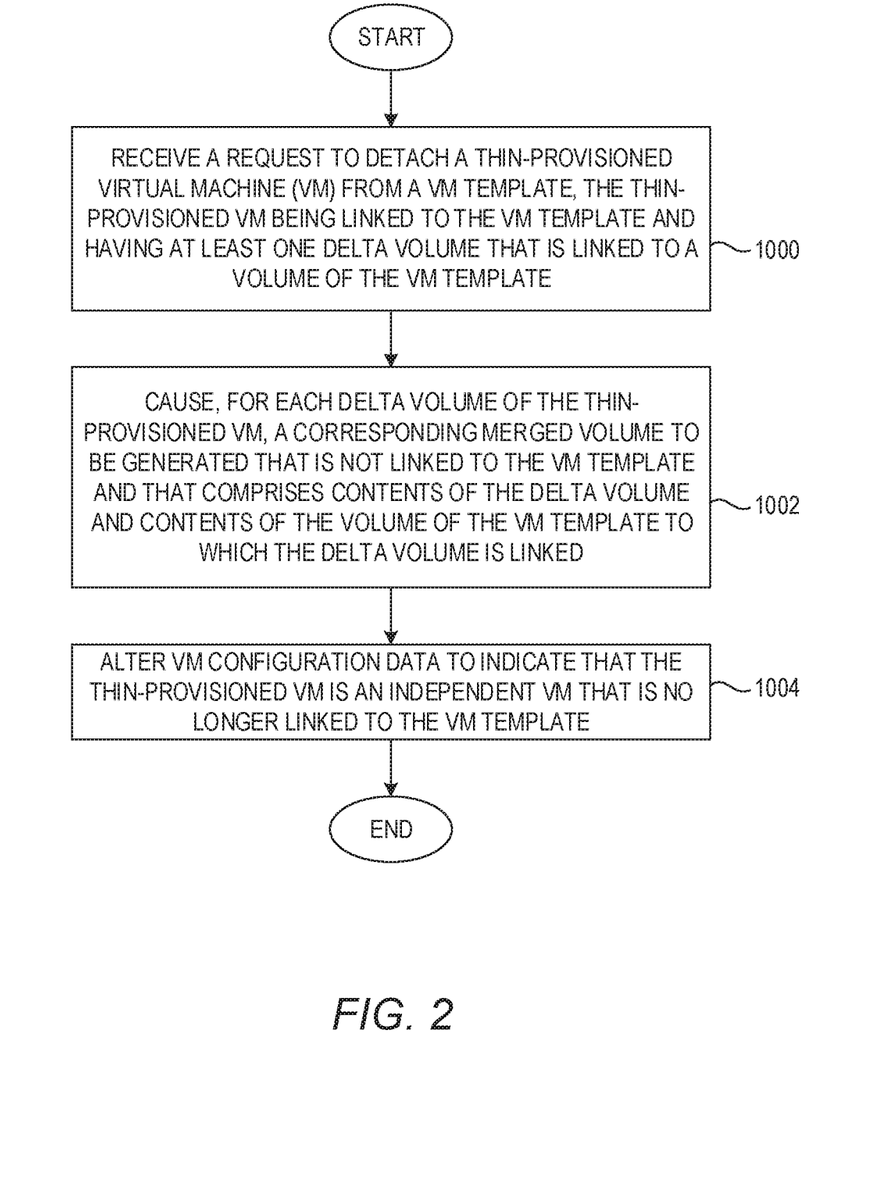
FIG. 2 is a flowchart of a method for detaching a thin-provisioned VM from a VM template according to one example.

FIG. 2 is a flowchart of a method for detaching the thin-provisioned VM 32 from the VM template 24 according to one example. FIG. 2 will be discussed in conjunction with FIGS. 1A-1C. The virtualization manager 14 receives a request to detach the thin-provisioned VM 32 from the VM template 24. The thin-provisioned VM 32 is linked to the VM template 24 and has at least one delta volume 34 that is linked to a volume 26 of the VM template 24 (FIG. 2, block 1000). The virtualization manager 14 causes, for each delta volume 34 of the thin-provisioned VM 32, a corresponding merged volume 70 to be generated that is not linked to the VM template 24 and that comprises the contents of the delta volume 34 and the volume 26 of the VM template 24 to which the delta volume 34 is linked (FIG. 2, block 1002). The virtualization manager 14 alters the VM configuration data 18 to indicate that the thin-provisioned VM 32 is an independent VM 32 that is no longer linked to the VM template 24 (FIG. 2, block 1004).

In some examples, the virtualization manager 14 can re-attach a standalone VM to the VM template 24. For example, assume that the operator enters a command, such as a RE-ATTACH command with certain parameters, such as the name of the independent VM 32 and the VM template 24. Assume that the state of the environment 10 at the time of the RE-ATTACH command is that illustrated in FIG. 1C.

Figure 3:
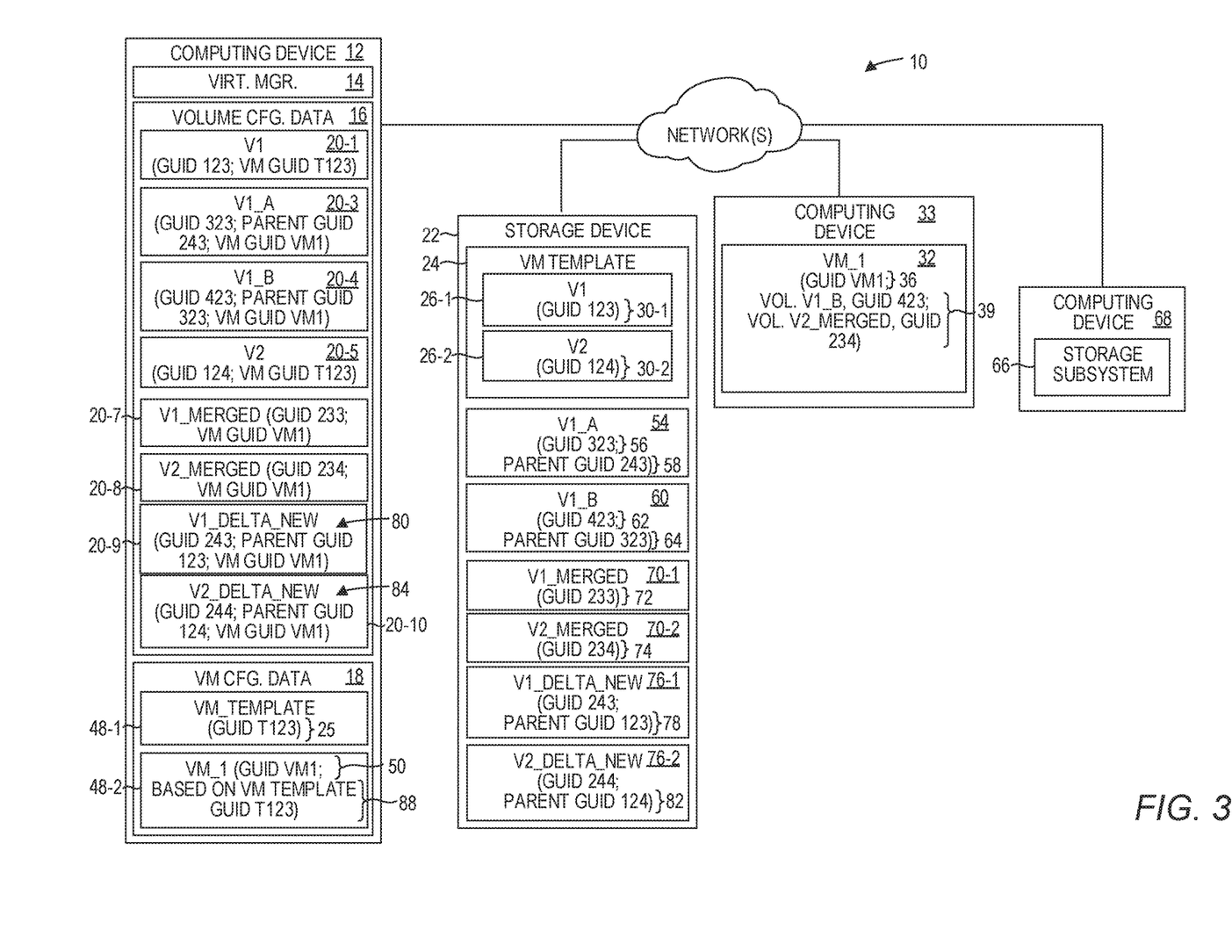
FIG. 3 is a block diagram of the environment illustrated in FIGS. 1A-1C after the implementation of a RE-ATTACH command.
Figure 4:
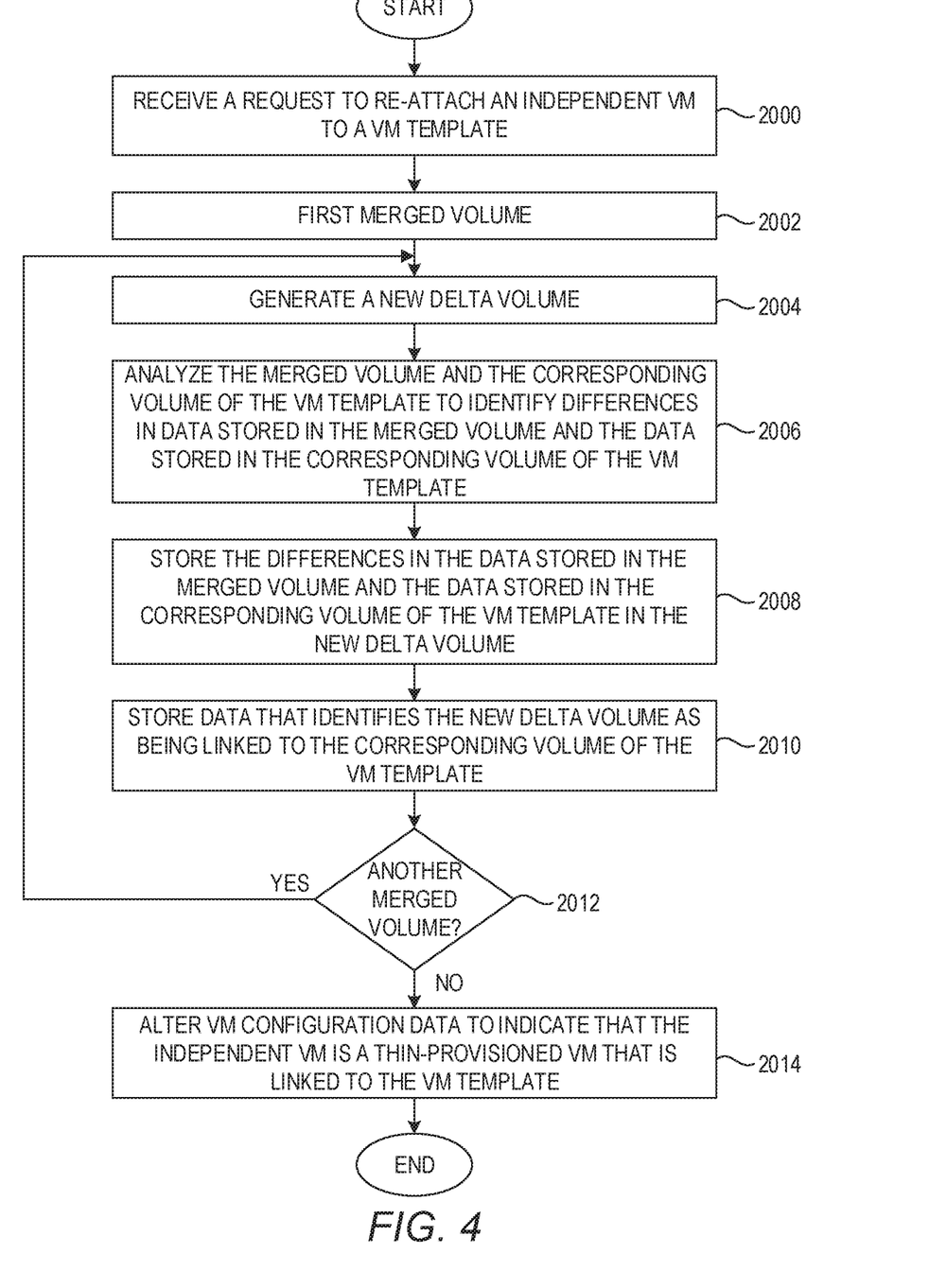
FIG. 4 is a flowchart of a method for re-attaching an independent VM to a VM template according to one example.

FIG. 3 is a block diagram of the environment 10 after the implementation of the RE-ATTACH command, as described in greater detail below. FIG. 4 is a flowchart of a method for re-attaching the independent VM 32 to the VM template 24 according to one example. FIG. 4 will be discussed in conjunction with FIG. 3. The virtualization manager 14 receives the RE-ATTACH command to re-attach the independent VM 32 to the VM template 24 (FIG. 4, block 2000).

The virtualization manager 14 accesses the VM configuration data 18 and determines that the VM 32 is independent of the VM template 24. The virtualization manager 14 then accesses the volume configuration data 16, and determines that the VM 32 has merged volumes 70-1, 70-2, and thus that the merged volumes 70-1, 70-2 are not delta volumes but instead include the data of the volumes 26-1, 26-2. For the merged volume 70-1, the virtualization manager 14 generates a new delta volume 76-1 (FIG. 4, blocks 2002-2004). The virtualization manager 14 analyzes the merged volume 70-1 and the corresponding volume 26-1 of the VM template 24 to identify differences in data stored in the merged volume 70-1 and the data stored in the corresponding volume 26-1 of the VM template 24 (FIG. 4, block 2006). The virtualization manager 14 stores the differences in the data stored in the merged volume 70-1 and the data stored in the corresponding volume 26-1 of the VM template 24 in the new delta volume 76-1 (FIG. 4, block 2008). The virtualization manager 14 stores data that identifies the new delta volume 76-1 as being linked to the corresponding volume 26-1 of the VM template 24 (FIG. 4, block 2010). In particular, the virtualization manager 14 generates metadata 78 that identifies the volume 26-1 of the VM template 24 as being a parent volume to the new delta volume 76-1. The virtualization manager 14 also generates a new volume entry 20-9 that identifies the new delta volume 76-1. The volume entry 20-9 also includes metadata 80 that identifies the volume 26-1 of the VM template 24 as being a parent volume to the new delta volume 76-1, and metadata identifying the volume 76-1 as being associated with the VM 32.

The virtualization manager 14 analyzes the volume configuration data 16 to determine if any snapshots of the volume 20-7 exist. The virtualization manager 14 determines that the snapshot volume 54 is a snapshot volume of the volume 20-7, and changes the metadata 58 to identify the new volume 76-1 as the parent of the snapshot volume 54.

The virtualization manager 14 repeats this process for the merged volume 70-2 (FIG. 4, block 2012). In particular, for the merged volume 70-2, the virtualization manager 14 generates a new delta volume 76-2. The virtualization manager 14 analyzes the merged volume 70-2 and the corresponding volume 26-2 of the VM template 24 to identify differences in data stored in the merged volume 70-2 and the data stored in the corresponding volume 26-2 of the VM template 24. The virtualization manager 14 stores the differences in the data stored in the merged volume 70-2 and the data stored in the corresponding volume 26-2 of the VM template 24 in the new delta volume 76-2. The virtualization manager 14 stores data that identifies the new delta volume 76-2 as being linked to the corresponding volume 26-2 of the VM template 24. In particular, the virtualization manager 14 generates metadata 82 that identifies the volume 26-2 of the VM template 24 as being a parent volume to the new delta volume 76-2. The virtualization manager 14 also generates a new volume entry 20-10 that identifies the new delta volume 76-2. The volume entry 20-10 also includes metadata 84 that identifies the volume 26-2 of the VM template 24 as being a parent volume to the new delta volume 76-2, and metadata identifying the new delta volume 76-2 as being associated with the VM 32.

The virtualization manager 14 generates metadata 86 that identifies the VM 32 as being linked to the VM template 24. The virtualization manager 14 also modifies the VM configuration entry 48-2 to include metadata 88 that identifies the VM 32 as being linked to the VM template 24 (FIG. 4, block 2014). In this manner, the virtualization manager 14 re-attaches the VM 32 to the VM template 24, and makes the VM 32 a thin-provisioned VM of the VM template 24.

While for purposes of illustration the actions relating to the generation and modifications of the volumes is attributed directly to the virtualization manager 14, in other examples the virtualization manager 14 causes the actions relating to the generation and modification of volumes via the storage subsystem 66.

Because the virtualization manager 14 is a component of the computing device 12, functionality implemented by the virtualization manager 14 may be attributed to the computing device 12 generally. Moreover, in examples where the virtualization manager 14 comprises software instructions that program a processor device to carry out functionality discussed herein, functionality implemented by the virtualization manager 14 may be attributed herein to such a processor device.

Figure 5:
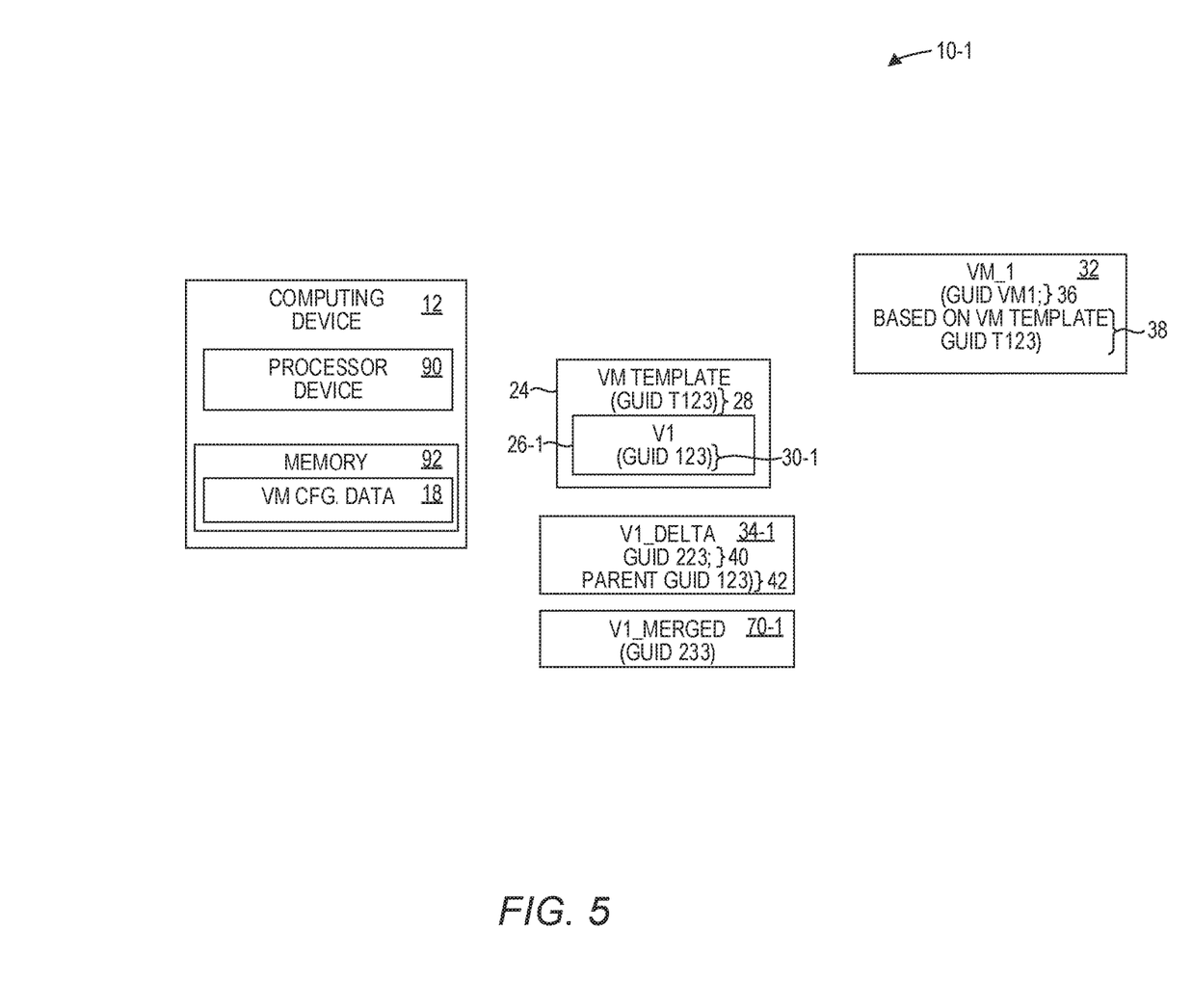
FIG. 5 is a block diagram of an environment according to another example.

FIG. 5 is a block diagram of an environment 10-1 according to one example. The environment 10-1 is a simplified version of the environment 10 discussed above. The computing device 12 includes a processor device 90 and a memory 92. The processor device 90 is coupled to the memory 92. The processor device 90 is to receive a request to detach the thin-provisioned VM 32 from the VM template 24. The thin-provisioned VM 32 is linked to the VM template 24 and has at least one delta volume 34-1 that is linked to a volume 26-1 of the VM template 24. The processor device 90 causes, for each delta volume 34-1 of the at least one delta volume 34-1 of the thin-provisioned VM 32, a corresponding merged volume 70-1 to be generated that is not linked to the VM template 24 and that comprises the contents of the delta volume 34-1 and the volume 26-1 of the VM template 24 to which the delta volume 34-1 is linked. The processor device 90 alters the VM configuration data 18 to indicate that the thin-provisioned VM 32 is no longer linked to the VM template 24.

Figure 6:
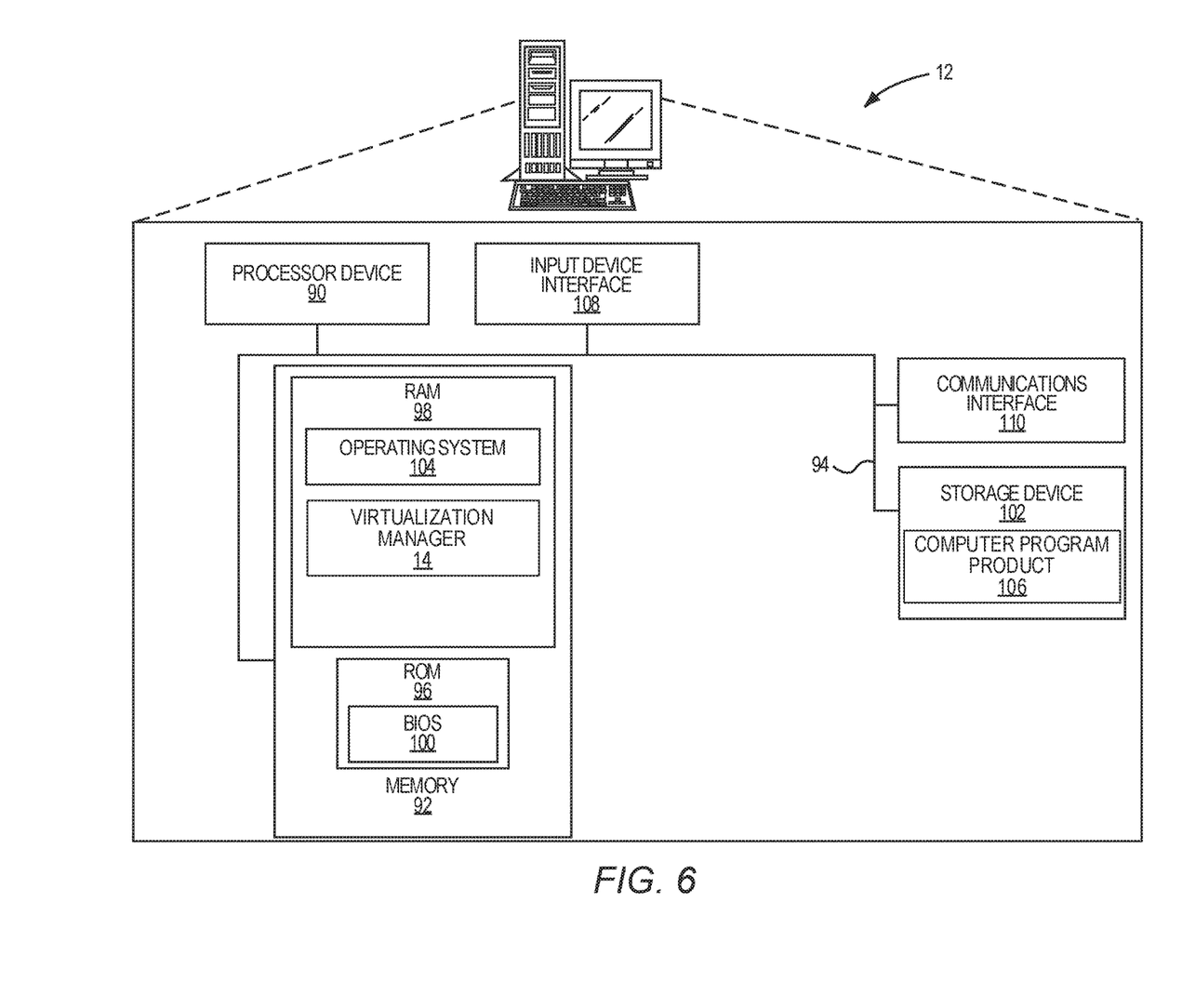
FIG. 6 is a block diagram of a computing device suitable for implementing examples according to one example.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 90, the memory 92, and a system bus 94. The system bus 94 provides an interface for system components including, but not limited to, the memory 92 and the processor device 90. The processor device 90 can be any commercially available or proprietary processor.

The memory 92 may include non-volatile memory 96 (e.g., read-only memory (ROM), erasable programmable read-only memory (EPROM), electrically erasable programmable read-only memory (EEPROM), etc.), and volatile memory 98 (e.g., random-access memory (RAM)). A basic input/output system (BIOS) 100 may be stored in the non-volatile memory 96 and can include the basic routines that help to transfer information between elements within the computing device 12. The volatile memory 98 may also include a high-speed RAM, such as static RAM, for caching data.

The computing device 12 may further include or be coupled to a non-transitory computer-readable storage medium such as a storage device 102, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 102 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 102 and in the volatile memory 98, including an operating system 104 the virtualization manager 14, which may implement the functionality described herein in whole or in part.

All or a portion of the examples may be implemented as a computer program product 106 stored on a transitory or non-transitory computer-usable or computer-readable storage medium, such as the storage device 102, which includes complex programming instructions, such as complex computer-readable program code, to cause the processor device 90 to carry out the steps described herein. Thus, the computer-readable program code can comprise software instructions for implementing the functionality of the examples described herein when executed on the processor device 90. The processor device 90, in conjunction with the virtualization manager 14 in the volatile memory 98, may serve as a controller, or control system, for the computing device 12 that is to implement the functionality described herein.

An operator may also be able to enter one or more configuration commands through a keyboard (not illustrated) or a pointing device such as a mouse (not illustrated). Such input devices may be connected to the processor device 90 through an input device interface 108 that is coupled to the system bus 94 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 110 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving a request to convert an existing thin-provisioned virtual machine (VM) to an independent VM, the thin-provisioned VM being linked to a VM template and having at least one delta volume that is linked to a volume of the VM template;
   causing, for each delta volume of the thin-provisioned VM, a corresponding merged volume to be generated that is not linked to the VM template and that comprises contents of the delta volume and contents of the volume of the VM template to which the delta volume is linked;
   altering VM configuration data to indicate that the thin-provisioned VM is an independent VM that is no longer linked to the VM template;
   receiving a request to re-attach the independent VM to the VM template; and
   for each corresponding merged volume:
      generating a new delta volume;
      analyzing the merged volume and the corresponding volume of the VM template to identify differences in data stored in the merged volume and data stored in the corresponding volume of the VM template;
      storing the differences in the data stored in the merged volume and the data stored in the corresponding volume of the VM template in the new delta volume; and
      storing data that identifies the new delta volume as being linked to the corresponding volume of the VM template.

2. The method of claim 1 further comprising altering volume configuration data for each delta volume to direct subsequent read operations and subsequent write operations directed to the delta volume to be directed to the corresponding merged volume.

3. The method of claim 1 further comprising removing each delta volume.

4. The method of claim 1 further comprising:
   determining that at least one snapshot volume of the at least one delta volume exists; and
   modifying volume configuration data to identify the at least one snapshot volume as being a snapshot volume of the merged volume that corresponds to the at least one delta volume.

5. The method of claim 4 further comprising:
   determining that a plurality of snapshot volumes of the at least one delta volume exists; and
   determining that the at least one snapshot volume is a first-generated snapshot volume of the plurality of snapshot volumes.

6. The method of claim 1 wherein causing, for each delta volume of the thin-provisioned VM, the corresponding merged volume to be generated further comprises:
   issuing, for each delta volume of the thin-provisioned VM, a command to a storage subsystem to merge the contents of the delta volume and the contents of the volume of the VM template to which the delta volume is linked into the corresponding merged volume.

7. The method of claim 1 further comprising:
   altering the VM configuration data to indicate that the independent VM is a thin-provisioned VM that is linked to the VM template.

8. A computing device comprising:
   a memory;

a processor device coupled to the memory to:
receive a request to detach a thin-provisioned virtual machine (VM) from a VM template, the thin-provisioned VM being linked to the VM template and having at least one delta volume that is linked to a volume of the VM template;
cause, for each delta volume of the thin-provisioned VM, a corresponding merged volume to be generated that is not linked to the VM template and that comprises contents of the delta volume and contents of the volume of the VM template to which the delta volume is linked;
alter VM configuration data to indicate that the thin-provisioned VM is an independent VM that is no longer linked to the VM template;
receive a request to re-attach the independent VM to the VM template; and
for each corresponding merged volume:
generate a new delta volume;
analyze the merged volume and the corresponding volume of the VM template to identify differences in data stored in the merged volume and data stored in the corresponding volume of the VM template;
store the differences in the data stored in the merged volume and the data stored in the corresponding volume of the VM template in the new delta volume; and
store data that identifies the new delta volume as being linked to the corresponding volume of the VM template.

9. The computing device of claim 8 wherein the processor device is further to alter volume configuration data for each delta volume to direct subsequent read operations and subsequent write operations directed to the delta volume to be directed to the corresponding merged volume.

10. The computing device of claim 8 wherein the processor device is further to:
determine that at least one snapshot volume of the at least one delta volume exists; and
modify volume configuration data to identify the at least one snapshot volume as being a snapshot volume of the merged volume that corresponds to the at least one delta volume.

11. The computing device of claim 10 wherein the processor device is further to:
determine that a plurality of snapshot volumes of the at least one delta volume exists; and
determine that the at least one snapshot volume is a first-generated snapshot volume of the plurality of snapshot volumes.

12. The computing device of claim 8 wherein to cause, for each delta volume of the thin-provisioned VM, the corresponding merged volume to be generated, the processor device is further to:
issue, for each delta volume of the thin-provisioned VM, a command to a storage subsystem to merge the contents of the delta volume and the contents of the volume of the VM template to which the delta volume is linked into the corresponding merged volume.

13. The computing device of claim 1 wherein the processor device is further to:
alter the VM configuration data to indicate that the independent VM is a thin-provisioned VM that is linked to the VM template.

14. A computer program product stored on a non-transitory computer-readable storage medium and including instructions to cause a processor device to:
receive a request to detach a thin-provisioned virtual machine (VM) from a VM template, the thin-provisioned VM being linked to the VM template and having at least one delta volume that is linked to a volume of the VM template;
cause, for each delta volume of the thin-provisioned VM, a corresponding merged volume to be generated that is not Linked to the VM template and that comprises contents of the delta volume and contents of the volume of the VM template to which the delta volume is linked;
alter VM configuration data to indicate that the thin-provisioned VM is an independent VM that is no longer linked to the VM template;
receive a request to re-attach the independent VM to the VM template; and
for each corresponding merged volume:
generate a new delta volume;
analyze the merged volume and the corresponding volume of the VM template to identify differences in data stored in the merged volume and data stored in the corresponding volume of the VM template;
store the differences in the data stored in the merged volume and the data stored in the corresponding volume of the VM template in the new delta volume; and
store data that identifies the new delta volume as being linked to the corresponding volume of the VM template.

15. The computer program product of claim 14 wherein the instructions further cause the processor device to alter volume configuration data for each delta volume to direct subsequent read operations and subsequent write operations directed to the delta volume to be directed to the corresponding merged volume.

16. The computer program product of claim 14 wherein the instructions further cause the processor device to:
determine that at least one snapshot volume of the at least one delta volume exists; and
modify volume configuration data to identify the at least one snapshot volume as being a snapshot volume of the merged volume that corresponds to the at least one delta volume.

17. The computer program product of claim 16 wherein the instructions further cause the processor device to:
determine that a plurality of snapshot volumes of the at least one delta volume exists; and
determine that the at least one snapshot volume is a first-generated snapshot volume of the plurality of snapshot volumes.

18. The computer program product of claim 14 wherein to cause, for each delta volume of the thin-provisioned VM, the corresponding merged volume to be generated, the instructions further cause the processor device to:
issue, for each delta volume of the thin-provisioned VM, a command to a storage subsystem to merge the contents of the delta volume and the contents of the volume of the VM template to which the delta volume is linked into the corresponding merged volume.

* * * * *

UNITED STATES PATENT AND TRADEMARK OFFICE
CERTIFICATE OF CORRECTION

PATENT NO. : 10,628,147 B2  
APPLICATION NO. : 15/688987  
DATED : April 21, 2020  
INVENTOR(S) : Maor Lipchuk et al.

Page 1 of 1

It is certified that error appears in the above-identified patent and that said Letters Patent is hereby corrected as shown below:

In the Claims

On Column 12, Lines 10-11, replace:
"a corresponding merged volume to be generated that is not Linked to the VM template and that comprises"
With:
--"a corresponding merged volume to be generated that is not linked to the VM template and that comprises"--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*